United States Patent [19]

Sämann

[11] Patent Number: 5,103,147
[45] Date of Patent: Apr. 7, 1992

[54] OPERATING DEVICE FOR CONSUMERS CONNECTED TO THE ELECTRIC SYSTEM OF MOBILE UNITS

[75] Inventor: Rudolf Sämann, Balingen-Ostdorf, Fed. Rep. of Germany

[73] Assignee: BSG-Schalttechnik GmbH & Co. KG, Balingen, Fed. Rep. of Germany

[21] Appl. No.: 375,775

[22] Filed: Jul. 5, 1989

[30] Foreign Application Priority Data

Jul. 14, 1988 [DE] Fed. Rep. of Germany ....... 3823778

[51] Int. Cl.$^5$ ............................................. H02M 3/335
[52] U.S. Cl. ..................................... 318/139; 318/599; 323/908
[58] Field of Search .................... 318/139, 599; 361/18; 323/222, 223, 224, 249, 250, 261, 265, 271, 281, 282, 908; 363/15, 16, 18, 19, 20, 21, 22, 23, 24, 25; 336/233

[56] References Cited

U.S. PATENT DOCUMENTS

| | | | |
|---|---|---|---|
| 4,010,401 | 3/1977 | Yasumatsuya et al. | 323/282 X |
| 4,017,745 | 4/1977 | McMahon | 323/282 X |
| 4,459,537 | 7/1984 | McWhorter | 323/224 |
| 4,504,896 | 3/1985 | Easter et al. | 323/222 X |
| 4,536,700 | 8/1985 | Bello et al. | 323/222 X |
| 4,626,766 | 12/1986 | Musil | 323/271 X |
| 4,652,984 | 3/1987 | van der Akker et al. | 363/18 |
| 4,761,722 | 8/1988 | Pruitt | 323/222 X |
| 4,823,247 | 4/1989 | Tamoto | 323/224 X |

FOREIGN PATENT DOCUMENTS

2825235 12/1978 Fed. Rep. of Germany ...... 336/233

*Primary Examiner*—Bentsu Ro
*Attorney, Agent, or Firm*—Darby & Darby

[57] ABSTRACT

In an operating device for high-current loads, such as fan motors, or the like, connected to the electric system of mobile units, in particular motor vehicles, it is proposed each respective electric motor is connected to the electric system via an electronic control circuit controlling the pulse width of the pulse supply voltage supplied to the motor for the purpose of adjusting the motor to different power requirements, with nominal-value adjustment. An interference elimination circuit including a series coil and at least one capacitor of high capacitance is arranged between the electronic control system and the electric system of the mobile unit. The series coil is equipped with an iron-powder core and designed in such a manner that no saturation is obtained even under maximum current conditions so that a sufficiently high inductivity reserve remains available for pulse damping.

22 Claims, 2 Drawing Sheets

OPERATING DEVICE FOR CONSUMERS CONNECTED TO THE ELECTRIC SYSTEM OF MOBILE UNITS

BACKGROUND OF THE INVENTION

It has been general practice to connect to the electric system of mobile units, in particular of motor vehicles, a plurality of loads of the most different kinds. The demands placed in this connection on the quality of the voltage supplied by the electric system vary very substantially, depending on the particular kind of connected load.

The following description will relate mainly to the conditions applicable to the electric system of motor vehicles, which indeed is a preferred field of application of the present invention, although it is of course expressly not limited to this field.

In connection with the supply of loads from the electric system of a mobile unit, a point that deserves particular attention is that, to the extent possible, no (vagabond) pulse peaks should be encountered as these may lead to quite considerable disturbances in electric systems of mobile units, in particular if sensitive loads are connected, such as computers, logic control circuits, or the like. Such pulse peaks are due, mainly, to cut-in or cut-off pulse edges, the steepness of which is of particular importance. If such vagabond switching surges, which are transmitted from the loads into the electric system, occur frequently then they may lead to heavy disturbance in the electric system of motor vehicles, or the like.

It has, therefore, been necessary heretofore to control specific types of loads of high and very high power only through range multipliers designed for the particular desired power output, for example in the case of a fan motor to switch on or off resistors connected in series with the motor windings, depending on the desired speed. Although it is absolutely possible to operate a fan motor or the motors of air-conditioning systems, or the like, also at low speeds—in fact this is almost always the case in practical operation—one has to put up in this case with the fact that the remaining power which is not consumed by the fan motor—for the purposes of the present description, the load will be described hereafter always as fan motor—then drops across the respective multiplier or multipliers. Consequently, the latter have to be sized generously, which on the one hand causes increased cost while on the other hand considerable amounts of energy are lost, which latter aspect leads to a generally unfavorable energy balance, with the environmental disadvantages necessarily resulting therefrom, and provides in addition the risk that the energy drain on the electric system of the vehicle may reach a critical range leading to a correspondingly high load on the battery (winter operation).

SUMMARY OF THE INVENTION

Now, it is the object of the present invention to provide an operating device for loads of high power connected to the electric system of mobile units, especially of motor vehicles, which on the one hand limits the current drain on the electric system to the values actually required for the operation of the load, while ensuring on the other hand that this does not result in pulse loading of the electric system, not even if very high currents are switched at optional, maybe even high frequency, as in the case of the pulse width control of the load supply voltage provided according to the invention.

The invention achieves this objective and provides the advantage to permit practically loss-free power control of motors connected to the electric system of motor vehicles, or the like, in particular of fan motors, even if these require currents of up to 10 amperes, or even more (20 amperes and above).

According to the basic embodiment of the present invention, the supply voltage of the (fan) motor is switched on and off abruptly via a semiconductor component (preferably a MOS-FET), at comparably high frequency (10 kHz and above, if desired, and as preferred for the present practical example), the power output on the connected motor being determined at any time by the pulse interval to pulse width ratio, i.e. the pulse duty factor of the driving rectangular pulse sequence of the supply voltage (or the supply current).

In this connection, the particular advantage of the present invention is seen in the fact that the interference elimination circuit associated with such an electronic control circuit is capable of absorbing even considerable pulse elevations with very steep edges and of preventing any pulse peaks from being transmitted to the general electric system, due to the fact that an anti-interference coil is connected in series with the electronic control circuit, which coil is preferably designed as a ring core coil comprising an iron-powder core which ensures that under normal operating currents the coil does not assume the state of saturation and that, preferably, at least 50% of its inductivity remain available as reserve for pulse damping.

Due to this iron-powder core, such a special iron-powder ring-core coil (typical data, for example, 40 $\mu$H, 20 A) offers a favorable frequency response curve, which means that it is perfectly capable of attenuating any occurring frequencies, and has a "saturation reserve" which ensures that the hysteresis curve determining the saturation behavior will be run through only about fifty percent even at maximum operating current during the switching-on phase of the series semiconductor switch leading to the motor. That is a considerable inductivity reserve remains available for damping the high switch-in and switch-off edges resulting from the pulse width control so that the combination with additional capacitors leads to a degree of interference elimination in such motor controls which has never been achieved heretofore.

Consequently, thanks to the invention, it is now possible for the first time to control fan motors or other motors, which in operation draw high currents from the electric system to which they are connected, by means of a pulse width control with current-dependent range selection, and to prevent at the same time the electric system from being loaded by pulse peaks, and quite generally to limit the current drain on the electric system to those values which are actually required for operation of the connected motor, without having to put up with high power losses.

The invention, therefore, does away with the need for range multipliers or other elements transforming energy into power losses and can also be produced simply and at low cost as regards the control electronics since, apart from the series semiconductor switching element, all other components may be integrated to any desired degree.

It goes without saying that in addition to the special type of coil used, the geometrical arrangement of the capacitors of high capacitance, which are also necessary for interference elimination, also play an important part, and this in connection with a closed metal housing which is used according to a consistent improvement of the present invention and which houses both the interference elimination circuit and the electronic control circuit and which, having its own ground connection, provides the other connection points for the anti-interference capacitors in geometrical distribution.

BRIEF DESCRIPTION OF THE DRAWING

One embodiment of the invention will be described hereafter with reference to the drawing in which.

DESCRIPTION OF THE EMBODIMENTS

Figure 1:
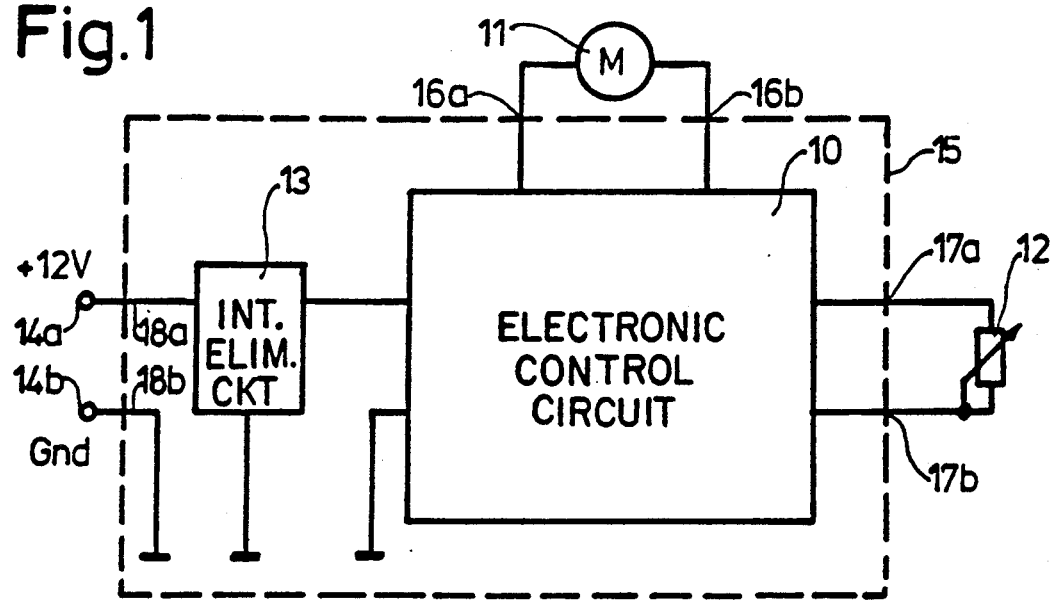
FIG. 1 shows a block diagram of the electronic control circuit for controlling the load (fan motor) and the associated interference elimination circuit, with the closed metal housing indicated diagrammatically.

It is the basic idea of the present invention that, in combination with a pulse width control, a connected load—which will be described hereafter as fan motor although this is not meant to limit the application of the invention—can be adjusted to different power requirements by means of the pulsed supply voltage ensured thereby. An associated interference elimination circuit can be designed in such a manner that a series-connected coil forming the interference elimination circuit in connection with capacitors of high capacitance comprises an iron-powder core (not a ferrite core) and is designed in such a manner that considerable inductivity reserves are available for pulse damping even at maximum operating current.

It has been known in this connection that in order to achieve a high degree of loss-free operation, loads can be operated with different power output requirements by using pulse width control. For example, loads connected to the usual voltage mains are supplied with delayed halfwaves of the supply voltage, the delay angle being determined (manually) by adjusting a potentiometer in the control circuit of the a triac.

In the case of the present invention, the electronic control circuit comprises an electronic switch which is connected in series with the load 11, which preferably takes the form of a fan motor, and which can be switched over by quick pulsed control from its conductive to its non-conductive state, as will be described in more detail further below, with reference to FIG. 4. Depending on the frequency and the pulse duty factor achieved thereby, different current-time areas are obtained in the supply voltage for the fan motor so that the load can be operated at very low power up to maximum power without notable losses, merely by controlling the pulse duty factor of the controlling pulse sequence.

The different pulse duty factors can be adjusted by means of an arrangement 12 for determining the nominal range which, normally, consists of a potentiometer or a variable resistor which supplies a comparator only with a reference potential, practically free from loss, from which the desired pulse duty factor of the rectangular pulse sequence of the supply voltage is then derived.

The set-up is completed by an interference elimination circuit 13, which is preceded by the electronic control circuit 10, and which circuit 13 connects to the two connection terminals 14a, 14b of the available electric voltage.

In the illustrated embodiment, the connection terminal 14a carries the supply voltage of 12 V, while the connection terminal 14b is connected to mass or ground (Gnd=Ground).

Both circuits are arranged within a closed metal housing 15, which preferably consists of copper and which encloses an electronic board or circuit board carrying the respective components of the electronic control circuit 10 and/or the interference elimination circuit 13.

The two connection lines 16a, 16b for the controlled fan motor, the two signal lines 17a, 17b for determining the nominal value and of course the two incoming lines 18a, 18b leading to the connections of the electric system are guided to the outside of the housing.

Figure 2:
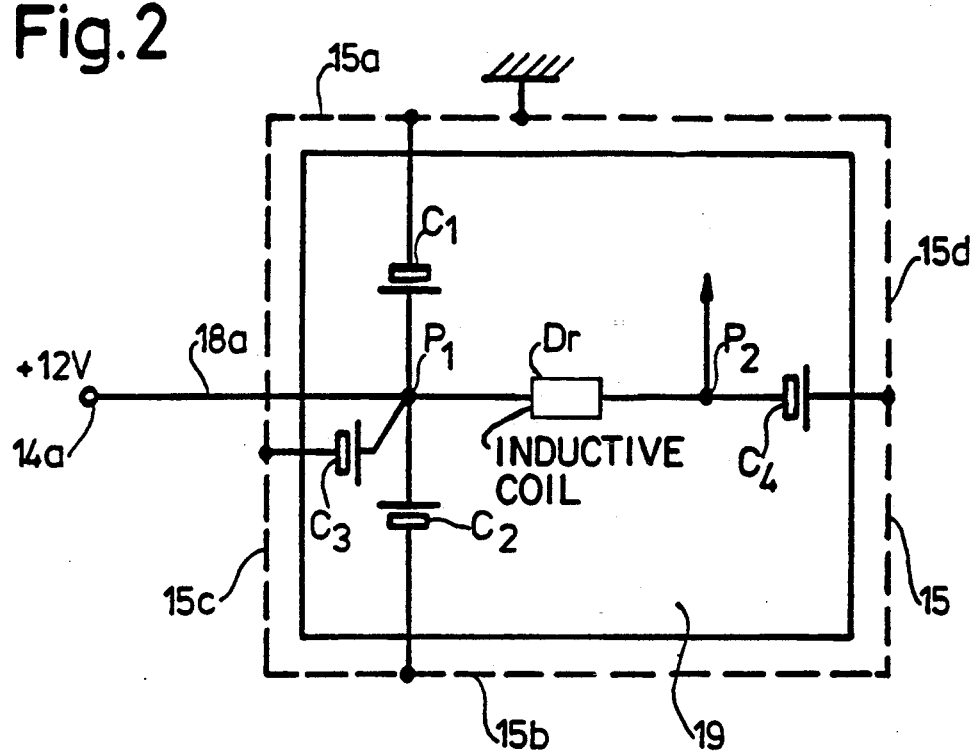
FIG. 2 shows an enlarged detail illustrating the geometrical/electric arrangement of the interference elimination circuit with the surrounding metal housing indicated diagrammatically.

The geometrical/electric arrangement of the electronic control circuit/interference elimination circuit 13 preferably that illustrated in FIG. 2. It should be noted in this connection that apart from the type and the electric characteristics of the anti-interference components, their mechanical position is also of considerable importance. FIG. 2 shows an electronic board 19 accommodated within the closed metal housing 15. It carries the anti-interference coil Dr, preferably in the form of a ring-core coil and four capacitors C1, C2 and C3, which together with the one connection to the ring-core coil Dr are connected to the input line 18a arriving from the positive connection of the electric system (+12V). One obtains in this manner a first common junction P1 which forms the starting point for one connection of the capacitors C1, C2 and C3, respectively. Regarding the closed metal housing 15 as viewed from the top, in the open condition, the capacitor C1, starting out from the electronic board 19 has its other connection connected, i.e. soldered, to one, in the drawing the upper, side wall 15a of the metal housing 15, while the capacitor C2 has its other connection connected, i.e. soldered, to the opposite side wall 15b of the metal housing 15. The capacitor C3 has its other connection connected to the front wall 15c of the metal housing 15, while the one connection of the fourth capacitor C4 is connected to the oppositely directed connection of the coil Dr, thus forming the function P2, the other connection of C4 is in contact with, and soldered to, the remaining side wall 15d of the metal housing 15. This geometrical structure, the closed metal housing consisting of copper in combination with the particular characteristics of the ring-core coil Dr and the electric characteristics of the capacitors, ensure that it is now possible to operate a fan motor—and other high-current loads operated with pulse width control—connected to the electric system of a motor vehicle without the risk of disturbances in the electric system of the mobile unit which might lead to failures or errors or may make themselves felt only as disagreeable phenomena, for example as crackling noise during otherwise troublefree radio reception.

Figure 4:
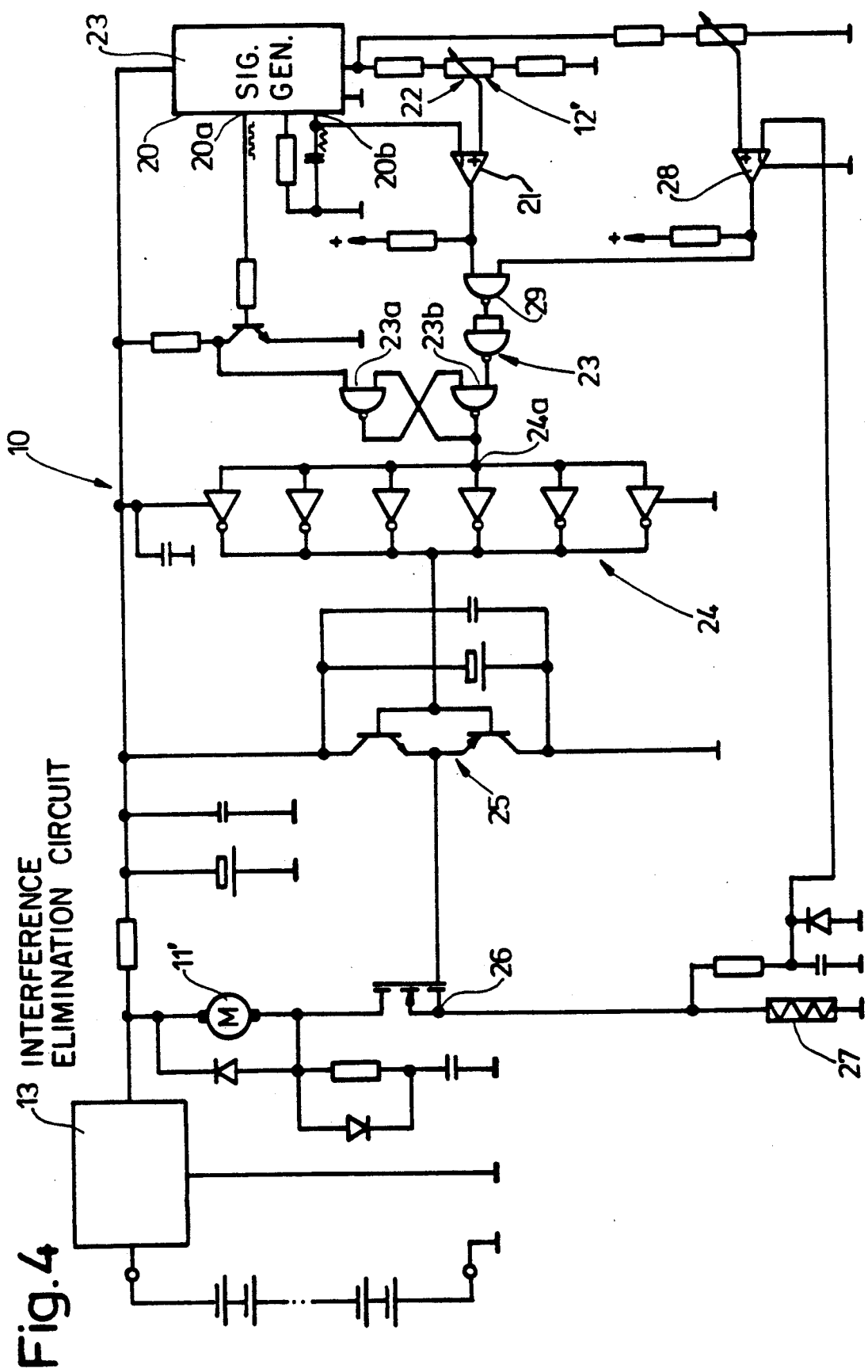
FIG. 4 illustrates an enlarged detail of one possible embodiment of the electronic control circuit for pulse width control of a high-current load.

The function P2 then forms simultaneously the connection to the electronic control system whose individual modules are not shown in detail in FIG. 2, but are preferably also mounted on the electronic board 19, as shown in FIG. 4. This will be understood easily as the entire electronic circuit, maybe with the exception of the semiconductor control element connected in series to the motor winding and a motor current sensor, may be integrated into a single chip.

Figure 3:
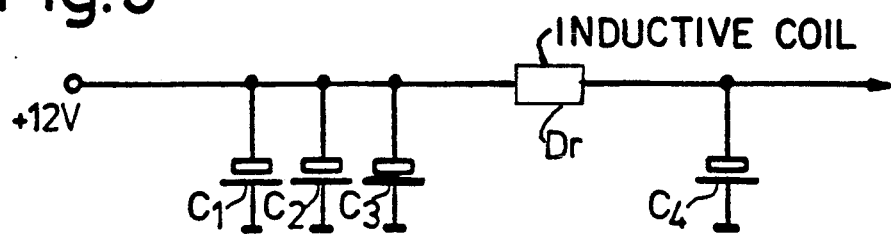
FIG. 3 shows an electric diagram of the interference elimination circuit.

The representation of FIG. 3 shows the electric circuit of the interference elimination elements consisting of the ring-core coil Dr and the four capacitors C1, C2, C3 and C4.

The capacitors may, for example, have the following values:

| C1, C2 | 300 μF |
|---|---|
| C3 | 150 μF |
| C4 | 470 μF. |

These high capacitance values are convenient for efficient interference elimination and are also appropriate in conjunction with the ring-core coil used, the latter being equipped with an iron-powder core of special design. The ring core coil may have an inductivity of 14 μH at 20 A, the iron powder core ensuring in this case that, unlike in the case of the known ferrite cores, the high currents encountered in this case do not immediately lead to magnetic oversaturation, but that instead an efficient inductivity reserve remains available for interference elimination. To say it in other words: the ring-core coil has a hysteresis curve which at maximum operating currents leaves at least 50%, for example, of residual inductivity for pulse damping. This means that it cannot in any case be run through to saturation by the maximum currents characteristic of the particular load connected at any time.

In connection with the iron-powder ring-core coil it should be noted in addition that the iron powder used should have a very small grain size (in the range of approx 4–5μ), in order to be able to dampen efficiently even at very high frequencies, in which case the bonding agent used must ensure the best possible insulation between the individual iron powder grains in order to prevent significant eddy-current losses. The iron powder used, in combination with the corresponding bonding agent, leads to the desired magnetic behavior, namely that the ring-core coil cannot be magnetized to saturation by the operating current, but will always have available the desired reserve for pulse damping.

The embodiment of an electronic control system, which is shown in FIG. 4 merely by way of example, includes initially an integrated circuit module 20 generating a rectangular pulse sequence at its one output 20a and a synchronous delta voltage at its other output 20b.

The delta voltage is supplied to the one input of an operational amplifier 21 where it is compared with a voltage level which is variable in magnitude. One derives therefrom the nominal value by means of a current-controlled nominal-value regulator 12' in the form of a potentiometer arranged in a resistor reference voltage branch 22 which is likewise supplied from the integrated component 23. The comparison between the reference voltage level and the delta voltage leads to switching points which—via subsequent circuit elements in the form of interconnected or coupled inverters or NAND gates 23 at the input 24a of a driver stage 24 (consisting of a plurality of inverters/amplifiers connected in parallel)—generate a rectangular pulse control sequence which exhibits different intervals and pulse widths as a function of the nominal-value variation and which finally controls the semi-conductor circuit element 26 in the form of the MOS-FET connected in series with the motor windings of the fan motor 11', via a subsequent push-pull amplifier circuit 25. In addition, there is provided a current feedback comprising a current sensor 27 connected in series with the fan motor 11' and the MOS-FET (26) and taking the form of a resistor of the lowest possible value whose output voltage is fed back via an operational amplifier 28 to one input of a NAND gate 29 whose other output is supplied with the output voltage switching points of the operational amplifier 21 resulting from the comparison between the delta voltage and the reference voltage level, whereby the current absorbed by the fan motor is checked (and limited).

It is expressly noted that the above description of the circuit embodiment is intended only to facilitate the comprehensive understanding of the invention, and that a pulse width control with current-depending nominal value of the type used in the above example may be implemented in any different ways and forms, in particular in the form of a highly integrated separate chip. The NAND gates 23a, 23b form in this case an oscillator stage.

All features mentioned or shown in the above description, the following claims and the drawing may be essential to the invention either alone or in any combination thereof.

I claim:

1. An operating protector device for use with electrical loads connected to a DC electric system having a DC supply, comprising:
   an electric load, said load being connected to the DC supply via an electronic control circuit effecting pulse width control of a pulse supply voltage, said voltage being supplied to said load for the purpose of adjusting the load to different power requirements;
   an interference elimination circuit for protecting said DC electric system against interference voltages resulting rom operation of said electronic control circuit, said elimination circuit including a series coil and at least one capacitor arranged in circuit between the electronic control circuit and said DC supply,
   said series coil being unsaturatable by maximum current conditions of said load, a sufficiently high inductivity reserve remain available in said coil for pulse damping at said maximum current conditions.

2. A device according to claim 1, wherein said series coil is a ring-core coil with an iron powder core.

3. A device as in claim 2, wherein the iron powder in the iron powder core of the ring-core coil is of small grain size in a range of approximately 4–5 microns, said powder being bonded together by an agent providing efficient electrical insulation between the grains.

4. A device as in claim 1, wherein at least said coil and said at least one capacitor of said interference elimination circuit are in a closed metal housing.

5. A device as in claim 4, wherein said electronic control circuit and at least said coil and said at least one capacitor of said elimination circuit are on a common electronic circuit board enclosed in said closed metal housing.

6. A device as in claim 5, wherein one terminal of each said capacitor is connected together with one terminal of said coil at a first junction, said DC supply having at least one ungrounded terminal, said first junction being connected to said ungrounded terminal, the other terminals of said capacitors being directly connected to said metal housing, said metal housing being grounded.

7. A device as in claim 6, and further comprising an additional capacitor, said additional capacitor being connected at one terminal to another terminal of said coil, the other terminal of said additional capacitor being connected to said grounded metal housing, said another coil terminal connecting to said control circuit.

8. A device as in claim 7, wherein said metal housing has four sides and the number of said capacitors is at least four, three of said capacitors having said one terminal connected to said first junction and their other terminals connected directly to said housing, each to a respective side thereof, said additional capacitor being connected at its other terminal to the fourth side of said metal housing.

9. A device as in claim 1, wherein said electronic control circuit provides a rectangular pulse sequence with variable pulse duty factor forming the pulse supply voltage to said load, and further comprising a DC voltage level regulator for adjusting a nominal value by comparison of a variable DC voltage potential and a gradually increasing ramp voltage, different switching points being formed relative to a time axis for triggering a subsequent rectangular pulse generator, a triggering pulse sequence from said generator being supplied to semiconductor circuit elements connected in series with said load, after amplification of said pulse sequence.

10. A device as in claim 9, wherein a voltage dropping current sensor is connected in series with said load and said series semiconductor circuit elements triggering said load, the voltage drop of said current sensor being fed back for controlling and limiting the current in said load.

11. An operating protector device for use with electrical loads connected to a DC electric system having a DC supply, comprising:
an electric load, said load being connected to the DC supply via an electronic control circuit effecting pulse width control of a pulse supply voltage, said voltage being supplied to said load for the purpose of adjusting the load to different power requirements;
an interference elimination circuit for protecting said DC electric system against interference voltages resulting form operation of said electronic control circuit, said elimination circuit including a series coil and at least one capacitor arranged in circuit with the electronic control circuit and positioned for connection between said DC supply and said electronic control circuit,
said series coil being unsaturatable by maximum current conditions of said load, a sufficiently high inductivity reserve remaining available in said coil for pulse damping at said maximum current conditions.

12. A device as in claim 11, wherein at least said coil and said at least one capacitor of said interference elimination circuit are in a closed metal housing.

13. A device as in claim 12, wherein one terminal of each said capacitor is connected together with one terminal of said coil at a first junction, said DC supply having at lest one ungrounded terminal, said first junction being subject to connection to said ungrounded terminal, the other terminals of said capacitors being directly connected to said metal housing, said metal housing being grounded.

14. A device as in claim 13, and further comprising an additional capacitor, said additional capacitor being connected at one terminal to another terminal of sad coil, the other terminal of said additional capacitor being connected to said grounded metal housing, said another terminal of said coil connecting to said control circuit.

15. A device as in claim 14 wherein said metal housing has four sides and the number of said capacitors is at least four, three of said capacitors having said one terminal connected to said first junction and their other terminals connected directly to said housing, each to a respective side thereof, said additional capacitor being connected at its other terminal to the fourth side of said metal housing.

16. A device as in claim 12, wherein said electronic control circuit and at least said coil and said at least one capacitor of said elimination circuit are on a common electronic circuit board enclosed in said closed metal housing.

17. An operating protector device for use with electrical loads connected to a DC electric system having a DC supply, each said load being connected to the DC supply via an electronic control circuit effecting pulse width control of a pulse supply voltage, said voltage being supplied to said load for the purpose of adjusting the load to different power requirements, comprising;
an interference elimination circuit for protecting said DC electric system against interference voltages resulting from operation of said electronic control circuit, said elimination circuit including a series coil and at least one capacitor, said series coil being unsaturatable by maximum current conditions produced by said load and said control circuit, a sufficiently high inductivity reserve remaining available in said coil for pulse damping at said maximum current conditions, said elimination circuit being subject to connection in circuit between the electronic control circuit and said DC supply.

18. A device as in claim 17, wherein at least said coil and said at least one capacitor of said interference elimination circuit are in a closed metal housing.

19. A device as in claim 18, wherein one terminal of each said capacitor is connected together with one terminal of said coil at a first junction, said DC supply having at least one ungrounded terminal, sad first junction being subject to connection to said ungrounded terminal, the other terminals of said capacitors being directly connected to said metal housing, said metal housing being grounded.

20. A device as in claim 19, and further comprising an additional capacitor, said additional capacitor being connected at one terminal to another terminal of said coil, the other terminal of said additional capacitor being connected to said grounded metal housing, said another terminal of said coil being subject to connection to said control circuit.

21. A device as in claim 20, wherein said metal housing has four sides and the number of said capacitors is at least four, three of said capacitors having said one terminal connected to said first junction and their other terminals connected directly to said housing, each to a respective side thereof, said additional capacitor being connected at its other terminal to the fourth side of said metal housing.

22. A device as in claim 18, wherein at least said coil and said at least on capacitor of said elimination circuit are on an electronic circuit board enclosed in said closed metal housing.

* * * * *